United States Patent
Laaser

(10) Patent No.: US 9,655,058 B2
(45) Date of Patent: May 16, 2017

(54) MULTI-STANDARD SYSTEMS AND METHODS WITH INTERFERER MITIGATION

(71) Applicant: Intel IP Corporation, Santa Clara, CA (US)

(72) Inventor: Peter Laaser, Munich (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/230,275

(22) Filed: Mar. 31, 2014

(65) Prior Publication Data

US 2015/0282099 A1 Oct. 1, 2015

(51) Int. Cl.
*H04B 7/00* (2006.01)
*H04W 52/24* (2009.01)

(52) U.S. Cl.
CPC ........... *H04W 52/243* (2013.01); *Y02B 60/50* (2013.01)

(58) Field of Classification Search
CPC .............................. H04W 84/18; H04W 88/06
USPC ....................................................... 455/41.2
See application file for complete search history.

(56) References Cited

U.S. PATENT DOCUMENTS

| | | | |
|---|---|---|---|
| 8,254,860 B2 | 8/2012 | Boos | |
| 8,289,837 B2 * | 10/2012 | Kim | H04B 1/005 370/208 |
| 8,655,400 B2 | 2/2014 | Kadous et al. | |
| 8,804,795 B2 | 8/2014 | Gilberton et al. | |
| 8,874,030 B2 | 10/2014 | Van Buren et al. | |
| 9,277,508 B2 | 3/2016 | Liu | |
| 2010/0150285 A1 * | 6/2010 | Tazebay | H04B 1/7097 375/346 |
| 2010/0227570 A1 | 9/2010 | Hendin | |
| 2012/0028591 A1 * | 2/2012 | Montalvo | H04B 1/0475 455/114.3 |
| 2012/0057655 A1 * | 3/2012 | Marsili | H04L 27/361 375/300 |
| 2012/0264381 A1 * | 10/2012 | Eisenhut | H04B 1/406 455/90.1 |
| 2013/0082781 A1 * | 4/2013 | Van Buren | H03G 3/3042 330/279 |
| 2015/0085634 A1 | 3/2015 | Yu et al. | |

FOREIGN PATENT DOCUMENTS

CN 103368590 A 10/2013

* cited by examiner

*Primary Examiner* — April G Gonzalez
(74) *Attorney, Agent, or Firm* — Eschweiler & Potashnik, LLC

(57) ABSTRACT

A system using multiple communication technologies for concurrent communication is disclosed. The system includes a transmitting subunit, a receiving subunit and a control unit. The transmitting subunit is configured to generate a transmit signal. The receiving subunit is configured to receive a receive signal. The control unit is coupled to the transmitting subunit and the receiving subunit and is configured to determine a presence or potential of crosstalk between the transmit signal and the receive signal. Additionally, the control unit is configured to reduce power of the transmitting subunit to mitigate the crosstalk.

20 Claims, 5 Drawing Sheets

MULTI-STANDARD SYSTEMS AND METHODS WITH INTERFERER MITIGATION

BACKGROUND

Generally, communication systems utilize a particular technology for exchanging information. At a first device, a transmitter uses the particular technology to generate and transmit a communication signal. At a second device, a receiver uses the particular technology to receive the communication signal.

However, a communication device limited to only a single technology can be problematic. For example, other devices using a different communication technology are unable to communicate with the first and second device.

One technique to overcome this limitation is to incorporate first and second communication technologies into a single device. This permits the single device to communicate with other devices using either technology.

However, incorporating different communication technologies into a single device can introduce inefficiencies, noise and impair performance.

DETAILED DESCRIPTION

Figure 1:
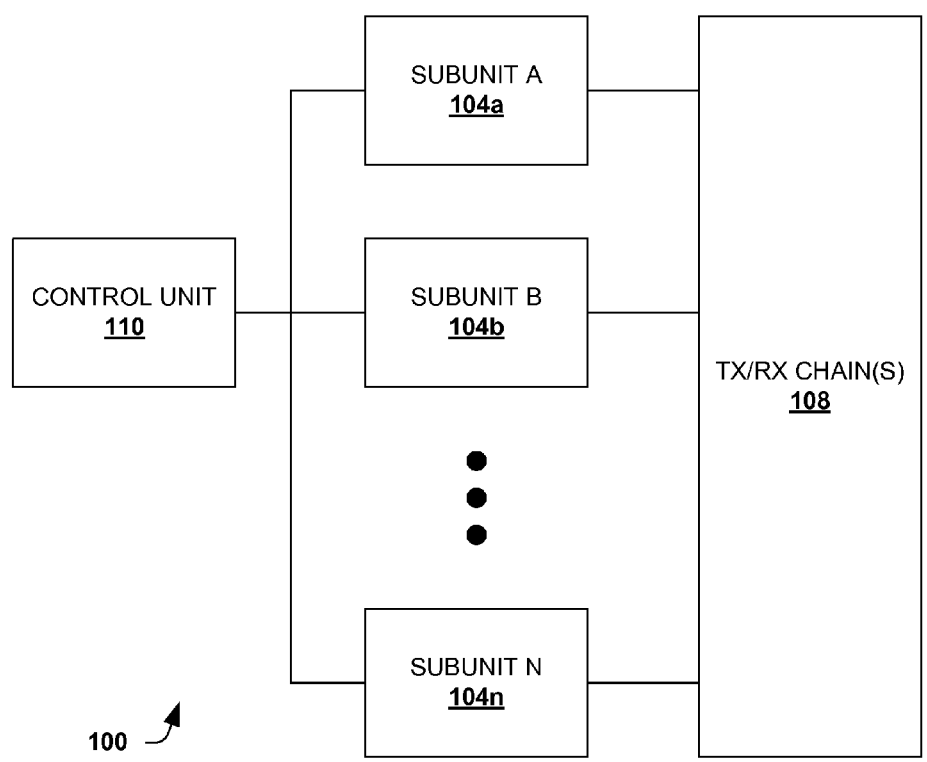
FIG. 1 is a block diagram illustrating a communication system having multiple communication technologies for concurrent communication.

The systems and methods of this disclosure are described with reference to the attached drawing figures, wherein like reference numerals are used to refer to like elements throughout, and wherein the illustrated structures and devices are not necessarily drawn to scale.

Devices, such as smart phones and tablets, rely on communications in order to provide users a good experience. In order to enhance the experience, multiple communication technologies can be used concurrently. For example, two common communication technologies or standards are Bluetooth and WiFi (wireless internet). Devices that utilize Bluetooth and WiFi can communicate in more places and with more devices that devices that use only one of the technologies.

A challenge to using multiple communication technologies is concurrency or TX/TX concurrency issues. The concurrency issues occur due to interference and the like between using multiple technologies on a single device. For example, operating in the same bandwidth, such as WiFi and Bluetooth which operate in the same 2.4 GHz band, develop concurrency issues.

In particular, crosstalk or interference can appear when two varied communication technologies are operated in parallel. Noise, such as spurs, out of band noise, and the like from a transmit signal of one technology can fall into a receive band of a second technology and degrade reception for the second technology.

FIG. 1 is a block diagram illustrating a communication system 100 having multiple communication technologies for concurrent communication. The multiple communication technologies share at least a portion of a transmit chain in order to mitigate concurrency issues and facilitate communication.

The system 100 is a communication system and can be incorporated as part of a device. The system 100 can have other components, but is shown with reduced complexity for illustrative purposes.

The system 100 includes a control unit 110, a plurality of subunits 104 and one or more transmit/receive chains 108. The system 100 can be part of a system on chip (SoC) device and used for communication and/or mobile phone applications. The subunits 104 are for sending/receiving information via varied communication technologies. The technologies can be related to particular standards including, but not limited to, GSM, UMTS, Bluetooth, FM radio, WiFi, and the like.

The transmit/receive chains 108 are coupled to the subunits 104. However, it is appreciated that the subunits can also be part of the chains 108. More than 1 of the subunits 104 may utilize a single transmit/receive chain of the chains 108. The transmit/receive chains 108 are configured to send and/or receive information signals for the subunits 104. The chains 108 can be configured to transform the information signals via one or more antennas (not shown).

The subunits 104 are configured to operate in parallel. Thus, for example, one subunit may be transmitting while another subunit is receiving. If the subunits are using different communication technologies, crosstalk or interference between the transmitting subunit and the receiving subunit may appear. Spurs or out of band noise of a transmit signal from the transmitting subunit can fall into a receive band of a receive signal for the receiving subunit. This degrades the receive signal and/or sensitivity.

The control unit 110 is coupled to the subunits 104. The control unit 110 is configured to identify potential crosstalk conditions. Once identified, the control unit 110 is configured to cause the offending subunit to reduce or adjust power by a determined amount. The determined amount, in one example, is a few dBs. The determined amount is a function of the receive signal strength for the receiving subunit. As a result, concurrent communications can occur for varied communication technologies.

In one example, a transmitting subunit of the subunits 104 is transmitting using a communication technology related to the Bluetooth standard and a receiving subunit of the subunits 104 is receiving using a communication technology using UMTS. The spectrum for this technology can have spurs at fractional amounts of the transmit (carrier) frequency. Thus, when the transmitting subunit is operated at frequency $f_{c,BT}$, spurs might appear at:

$f_{spur} = (M/N) \times f_{c,BT}$, where M and N denote integer numbers.

$f_{spur} = f_{c,BT} +/- N \times f_{const}$, where N denotes an integer number and $f_{const}$ denotes a constant frequency value. In one example, $f_{const}$ is the value of a reference clock, such as 26 MHz.

$f_{spur}=N \times f_{const}$, where N denotes an integer number and $f_{const}$ denotes a constant frequency value. In one example, $f_{const}$ is the value of a reference clock, such as 26 MHz.

Bluetooth applies channel hopping and is operated in the ISM frequency band (2402 MHz, channel 0, to 2480 MHz, channel 78). When Bluetooth transmits at high channel numbers, spurs might appear in the UMTS RX band (2110-2170 MHz) and degrade the sensitivity of the receiving subunit (UMTS receiver).

EXAMPLE

For M=6 and N=7 the Bluetooth TX spur appears at $f_{spur}=(6/7) \times f_{c,BT}=2058.86 \ldots 2125.71$ MHz, which partially falls into the UMTS RX band I (2110-2170 MHz).

Thus, for this example, the control unit 110 can identify the potential for crosstalk by checking the bandwidth used by the receiving subunit and see if a spur falls within it. If so, the control unit 110 adjusts the transmit power of the transmitting subunit and both subunits can operate concurrently.

Other approaches to maintain concurrent communications between parallel communications include high linearity, external filter components, and masking. The high linearity requires that the transmitting subunit operate with sufficiently high linearity to mitigate crosstalk. However, this results in higher current and, therefore, higher power consumption. Further, the higher linearity may not sufficiently reduce the crosstalk to permit concurrent communications. The external filter approach relies on an external filter of the transmit signal to attenuate out of band components of the transmit signal. Typically, a high filter order is required since the distance of frequency bands of different standards is small for a logarithmic scale. Additionally, the external filter approach requires additional components, which increase system cost and consume area on printed circuit boards (PCB). The masking approach involves removing or masking selected or critical transmit frequency for the transmitting subunit. However, this can substantially slow down transmission.

Figure 2:
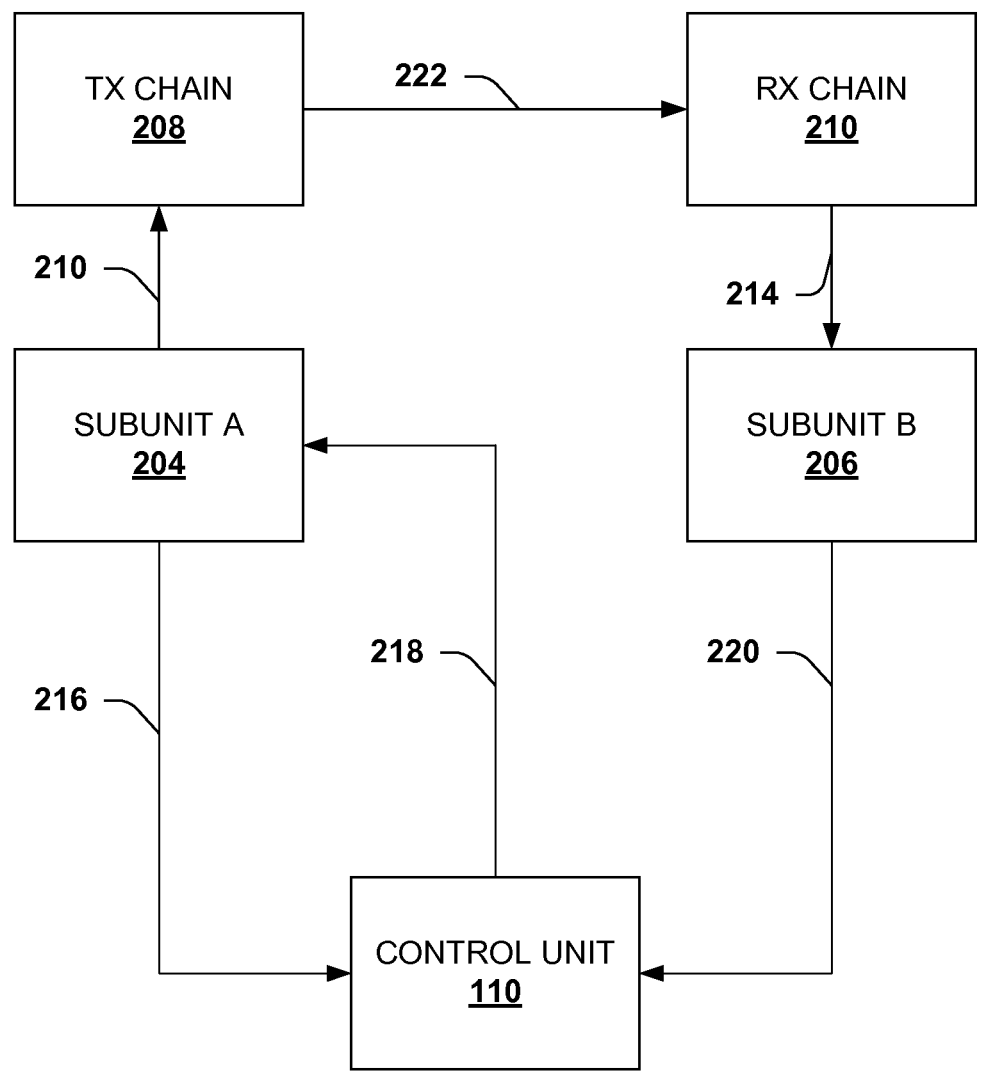
FIG. 2 is a block diagram illustrating a communication system having two communication technologies for concurrent communication.

FIG. 2 is a block diagram illustrating a communication system 200 having two communication technologies for concurrent communication. The system adjusts power of a transmit signal to mitigate degradation of a receive signal using a different communication technology. The system 200 is also an example of a variation of the system 100, described above.

The system 200 includes a subunit A 204, a subunit B 206, a control unit 110, a transmit chain 208, and a receive chain 210. The subunit A 204 is configured to generate a transmit signal 210 and uses a first communication technology based on a first standard. The subunit B 206 is configured to receive a receive signal 214 using a second communication technology based on a second standard, wherein the second standard is different from the first standard. In one example, the first standard is Bluetooth and the second standard is UMTS. In this example, the subunit A 204 is described as the transmitting subunit and the subunit B 206 is described as the receiving subunit. However, it is appreciated that the subunits 204 and 206 can be configured to perform transmitting, receiving, or both. For example, in one variation, the subunit A 204 is configured as a receiving subunit and the subunit B 206 is configured as a transmitting subunit.

The transmit signal 210 is provided to the transmit chain 208, which is configured to transfer the transmit signal 210 external to the system 200. The receive signal 214 is provided by the receive chain 210, typically from a source external to the system 200. In this example, crosstalk 222 is potentially generated from the transmit chain 208 and enters the receive chain 210 and impacts the receive signal 214. Unless mitigated, the crosstalk 222 degrades the receive signal 214 and/or reduces sensitivity of the subunit B 206.

The control unit 110 is coupled to the subunit A 204 and the subunit B 206. The control unit 110 is configured to identify potential crosstalk 222 from the generation of the transmit signal 210 by the subunit A 204 that impacts the received signal 214 obtained by the subunit B 206. In order to mitigate the potential crosstalk 222, the control unit 110 is configured to reduce power of the transmit signal 210 by a determined amount by a reduce gain signal 218. The control unit 110 analyzes information from the subunit A 204 via signal 216 and information from the subunit B 206 via signal 220. The signal 216 the communication technology and/or standard used by the subunit A 204. Additionally, the signal 216 can also include a spur frequency of the transmit signal 210 and the like. The signal 220 from the subunit B 206 includes the communication technology and/or standard used by the subunit B 206 for receiving. Additionally, the signal 220 can include a carrier frequency of the receive signal 214, a bandwidth of the receive signal 214, and the like.

The subunit A 204 receives the reduce gain signal 218 and reduces its gain by the determined amount, which is included in the reduce gain signal 218. The reduced gain mitigates the generation of a spur frequency of the transmit signal 210, which in turn mitigates the crosstalk 222.

Figure 3A:
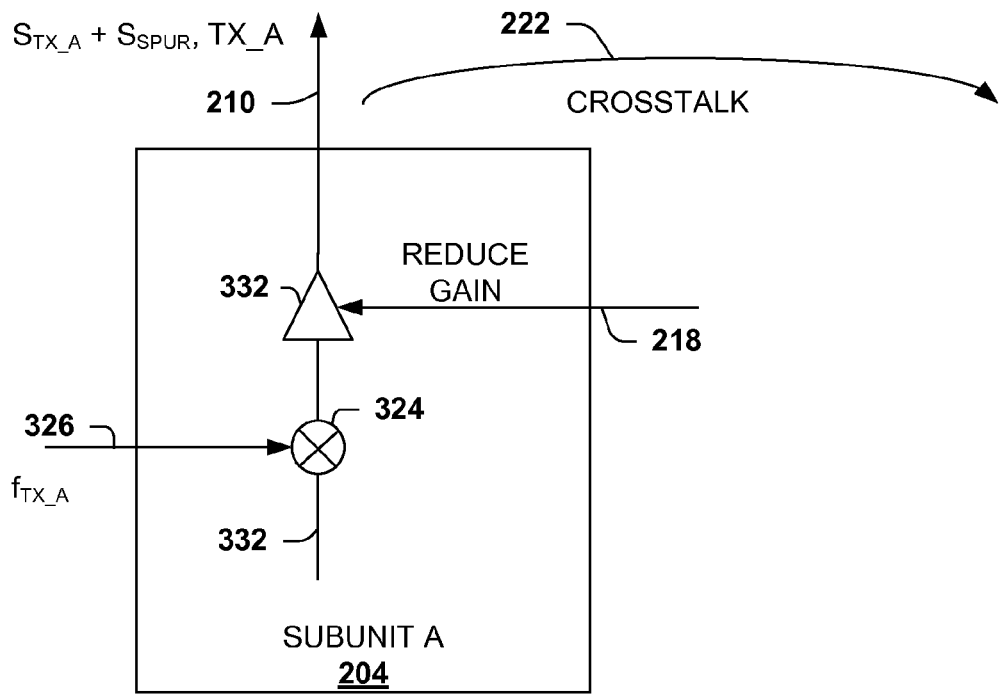
FIG. 3A is a diagram illustrating a transmitting subunit as part of a communication system.
Figure 3B:
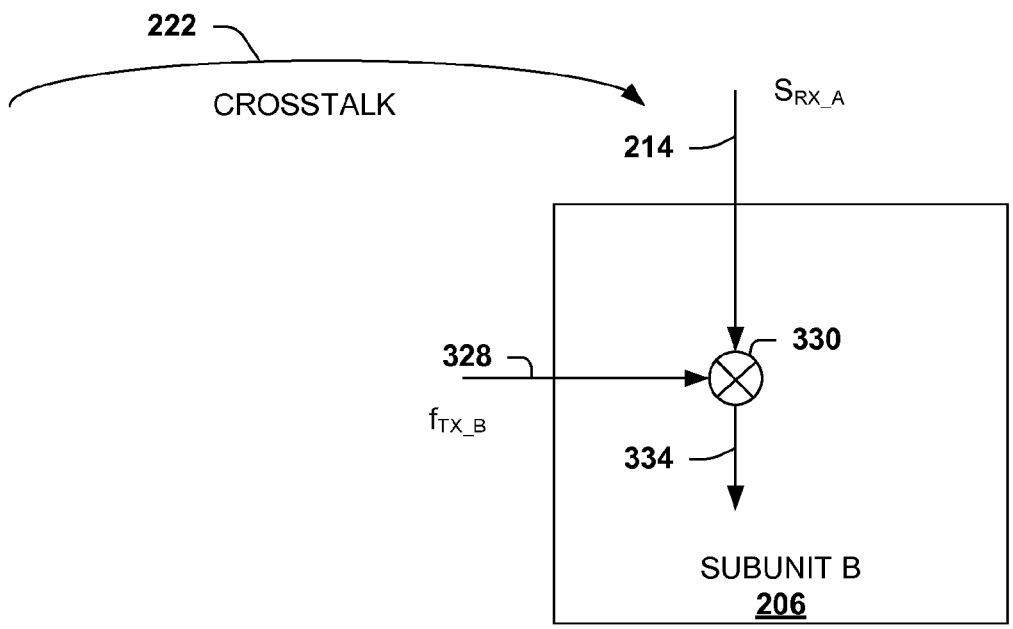
FIG. 3B is a diagram illustrating a receiving subunit as part of a communication system.

FIGS. 3A and 3B depict subunits with additional details. These are described in conjunction with FIG. 2 and system 200 in order to facilitate understanding.

FIG. 3A is a diagram illustrating a transmitting subunit as part of a communication system. The subunit is the subunit A 204 for FIG. 2. Here, the subunit 204 is described with additional details. However, it is appreciated that variations are contemplated.

The subunit A 204 includes a mixer 324 and a gain adjustable amplifier 332. The mixer 324 receives an information signal 332 and a transmit carrier frequency signal 326. It is noted that the transmit carrier frequency signal 326 is also provided to the controller 110. The mixer 324 mixes the signal 332 with the transmit carrier frequency signal 326 to generate a mixed output signal.

The amplifier 332 receives the mixed output signal from the mixer 324 and applies a selected gain to generate a transmit signal 210. The amplifier 332 is configurable to modify its gain when generating the transmit signal 210. The selected gain is modified or set by the reduce gain signal 218. A spur present in the transmit signal 210 results in potential crosstalk 222, as described above.

FIG. 3B is a diagram illustrating a receiving subunit as part of a communication system. The subunit is the subunit B 206 for FIG. 2. Here, the subunit 206 is described with additional details. However, it is appreciated that other variations are contemplated.

The subunit 206 includes a mixer 330. The mixer 330 receives a receive signal 214 and a B transmit carrier frequency 328. Based on its inputs, the mixer 330 obtains a processed receive signal 334. The B transmit carrier frequency 328 is also provided to the control unit 110.

The presence of crosstalk 222 can degrade the receive signal 214 and reduce sensitivity of the receiving subunit 206.

As stated above, the control unit 110 mitigates the generation of the crosstalk by modifying the gain of the transmitting unit by a determined amount.

The control unit 110 determines whether there is the potential for crosstalk according to the formula:

$$|S_{spur,TX\_A} - f_{RX\_B}| \leq 0.5 \cdot BW_{RX\_B} \quad \text{(Eq. 1)}$$

Where $S_{spur,TX\_A}$ is a spur of the transmit signal 210;

$S_{TX\_A}$ is a wanted transmit signal 210 for the subunit A 204;

The overall transmit signal 210 includes $S_{TX\_A}$ and $S_{spur,TX\_A}$;

$S_{TX\_B}$ is the wanted receive signal;

$F_{TX\_A}$ is the carrier frequency 326 of the transmit signal 210;

$F_{RX\_B}$ is the carrier frequency of the receive signal 214; and $B_{WRX\_B}$ is the bandwidth of the receive signal 214.

If Eq. 1 is satisfied or met, the control unit 110 determines that there is potential crosstalk 222 present. Then, the control unit 110 uses the reduce gain signal 218 to reduce the transmit power of the transmitting subunit. The control unit 110 is configured to determine the amount of reduced power and gain and then modifies the reduce gain signal 218 to provide the reduced power. Typically, a reduced power or gain of a few dBs is sufficient.

Figure 4:
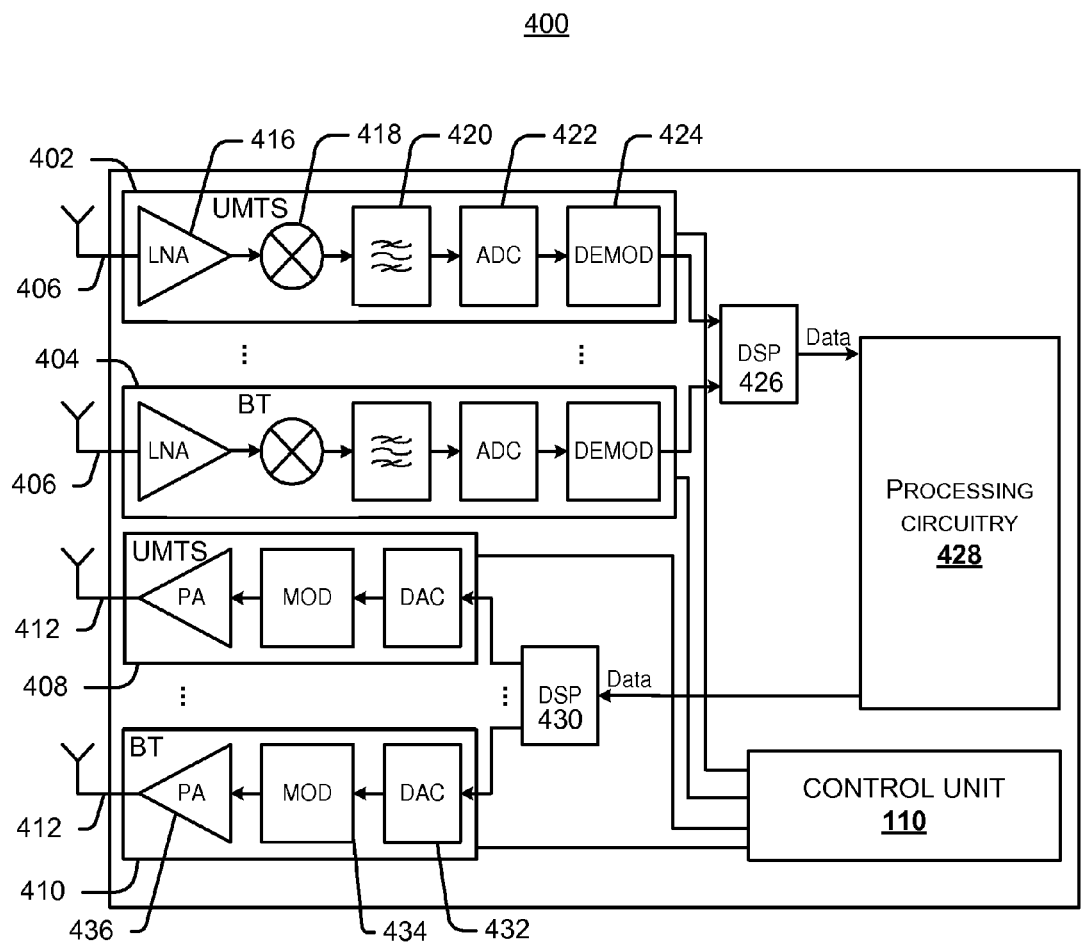
FIG. 4 is a diagram illustrating a transceiver system having multiple communication technologies for concurrent communication.

FIG. 4 is a diagram illustrating a transceiver system 400 having multiple communication technologies for concurrent communication. The system 400 can incorporate the above systems and may be part of a communications device. The system 400 is configured to utilize multiple communication technologies, such as UMTS and Bluetooth. However, it is appreciated that variations of the system 400, including using other communication technologies, are contemplated.

Paths 402 and 404 are configured as reception paths to receive signals using receiving antenna 406 or other suitable receiving mechanisms. Path 402 is configured for receiving UMTS signals and path 404 is configured for receiving Bluetooth signals. The paths or chains 402 and 404 include or incorporate receiving subunits, such as the subunit 206, described above. For example, the path 402 is shown including a low noise amplifier (LNA) 416, a mixer 418, a filter 420, an analog to digital converter (ADC) 422 and a demodulator 424. For the path 402, the receiving subunit includes the mixer 418, in one example. The receiving paths 402 and 404 provide received data to processing circuitry 428 via digital signal processor 426.

Paths 408 and 410 are configured as transmission paths to transmit signals using antenna 412 or other suitable transmitting mechanisms. In this example, path 408 is configured for transmitting UMTS signals and path 410 is configured for transmitting Bluetooth signals. The paths or chains 408 and 410 include or incorporate transmitting subunits, such as the subunit 204, described above. For example, the path 410 is shown with a digital to analog converter (DAC) 432, a modulator 434, and an adjustable gain power amplifier (PA) 436. Thus, in one example, a transmitting subunit includes the power amplifier (PA) 436. The transmitting paths 408 and 410 transmit data provided by the processing circuitry 428 via digital signal processor 430.

The paths 402, 404, 408 and 410 can be configured for other communication technologies including, but not limited to UMTS, Bluetooth, WiFi, LTE, WiMax, and the like.

The control logic 110 is configured to control the paths and communication technologies used for the paths. The control logic 110 may be connected to individual components within the paths, such as the power amplifier 436. The control logic 110 is configured to identify potential crosstalk between transmitting paths and receiving paths. Once identified, the control logic 110 mitigates the occurrence of the crosstalk by adjusting power levels or gains of one or more of the transmitting paths 410 and 408. For example, the control logic 110 can provide a reduce gain signal to the power amplifier 436, to adjust the transmit power of the path 410.

Figure 5:
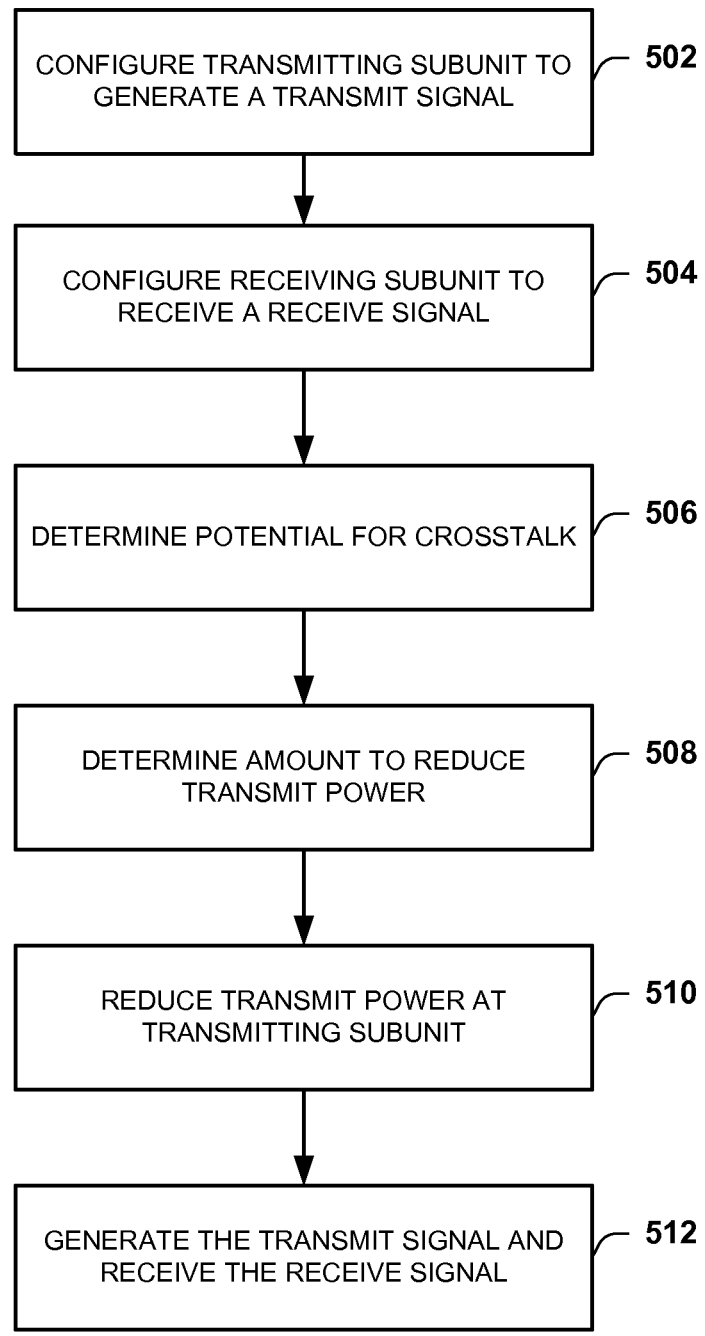
FIG. 5 is a flow diagram illustrating a method of mitigating interference or crosstalk for a communication system using multiple communication technologies.

FIG. 5 is a flow diagram illustrating a method 500 of mitigating interference or crosstalk for a communication system using multiple communication technologies.

The method begins at block 502, where a transmitting subunit is configured to generate a transmit signal using a transmit carrier frequency and a first communication technology. The subunit can be, for example, one of the subunits described above with regards to systems 100 and 200. The transmit signal is obtained by mixing an input signal with the transmit carrier frequency. The first communication technology is related to a standard including, but not limited to, GSM, UMTS, Bluetooth, FM radio, WiFi, and the like.

A receiving subunit is configured to receive a signal using a second transmit carrier frequency and a second communication technology at block 504. The receiving subunit can also be, for example, one of the subunits described above with regards to systems 100 and 200. The second communication technology is related to a standard including, but not limited to, GSM, UMTS, Bluetooth, FM radio, WiFi, and the like.

A control unit determines whether potential crosstalk is present at block 506 before the transmitting subunit begins transmitting and the receiving subunit begins receiving. The control unit obtains information about the transmitting subunit and the receiving subunit, including, but not limited to receiving subunit/signal bandwidth, carrier frequency for the second (receiving) communication technology, carrier frequency for the first (transmitting) communication technology and spur frequency for the first (transmitting) communication technology. In one example, equation 1, described above, is used to detect the presence of potential crosstalk by comparing a difference of the spur frequency and the carrier frequency of the second (receiving) communication technology with a threshold value. The threshold value is based on a bandwidth of the second (receiving) communication technology multiplied by a factor or coefficient, such as 0.5.

Upon the presence of potential crosstalk, the control unit determines an amount to reduce transmit power of the transmitting subunit at block 508. The amount is derived from factors including the carrier frequencies, bandwidth, and the like, described above. Typically, the amount is relatively small, such as a few decibels. The amount is chosen to mitigate the potential crosstalk while maintaining suitable transmission efficiency for the transmit signal.

Reducing the transmit power of the transmitting subunit by the determined amount at block 510. As a result, the presence of the crosstalk is mitigated and the receive signal can be received without substantial degradation from crosstalk and/or transmitting frequency spurs.

The transmitting subunit initiates generation of the transmit signal and the receiving subunit starts receiving the receive signal at block 512. The transmit signal generation is performed with the reduced power, generally by adjusting amplifier gain, such as described above. Additionally, the receive signal is received without substantial noise due to crosstalk, spurs, and the like. It is appreciated that alternative methods and systems include reducing or adjusting the transmit power after initiation of generating the transmit signal.

While the methods provided herein are illustrated and described as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

It is noted that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown above, are non-limiting examples of circuits that may be used to implement disclosed methods and/or variations thereof). The term "article of manufacture" as used herein is intended to encompass a computer program accessible from any computer-readable device, carrier, or media. Those skilled in the art will recognize many modifications may be made to this configuration without departing from the scope or spirit of the disclosed subject matter.

Examples may include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a system for concurrent communication using multiple communication technologies. The system includes a transmitting subunit, a receiving subunit and a control unit. The transmitting subunit is configured to generate a transmit signal. The receiving subunit is configured to receive a receive signal. The control unit is coupled to the transmitting subunit and the receiving subunit and is configured to determine a presence or potential of crosstalk between the transmit signal and the receive signal. Additionally, the control unit is configured to reduce power of the transmitting subunit to mitigate the crosstalk.

Example 2 is a system including the subject matter of example 1, wherein the transmitting subunit includes a first communication technology and the receiving subunit includes a second communication technology. The second communication technology is different than the first communication technology.

Example 3 is a system including the subject matter of example 2, where the first communication technology is Bluetooth and the second communication technology is UMTS.

Example 4 is a system including the subject matter of examples 1-3, including or omitting features, where the control unit uses or has the first communication technology and the second communication technology to determine the presence of crosstalk.

Example 5 is a system including the subject matter of examples 1-4, including or omitting features, where the transmit signal includes a wanted signal and a spur signal.

Example 6 is a system including the subject matter of examples 1-5, including or omitting features, where the transmitting subunit includes a mixer coupled to a transmit carrier frequency and a gain adjustable amplifier configured to receive an output of the mixer and to generate the transmit signal.

Example 7 is a system including the subject matter of examples 1-6, including or omitting features, where the control unit is configured to determine a reduced gain, to generate a reduced gain signal according to the reduced gain, and to provide the reduced gain signal to the transmitting subunit.

Example 8 is a system including the subject matter of examples 1-7, including or omitting features, where the control unit is configured to determine the presence of crosstalk according to one or more factors. The one or more factors include one or more of, a carrier frequency of the transmit signal, a carrier frequency of the receive signal, a bandwidth of the receive signal, a frequency spur of the transmit signal, and a constant frequency.

Example 9 is a system including the subject matter of examples 1-8, including or omitting features, where further including a transmit chain coupled to the transmitting subunit and a receive chain coupled to the receiving subunit.

Example 10 is a system including the subject matter of examples 1-9, including or omitting features, where the receiving unit includes a mixer configured to receive the receive signal and a receiving carrier frequency.

Example 11 is a system including the subject matter of examples 1-10, including or omitting features, where the transmitting subunit is configured to receive a second receive signal.

Example 12 is a system including the subject matter of examples 1-11, including or omitting features, further including one or more additional subunits.

Example 13 is a system for concurrent communication using multiple communication technologies. The system includes a plurality of subunits and a control unit. The plurality of subunits are configurable for transmitting or receiving. The control unit is coupled to the plurality of subunits. The control unit is configured to identify concurrent communication between a transmitting subunit of the plurality of subunits and a receiving subunit of the plurality of subunits. Further, the control unit is configured to determine the presence of a transmit frequency spur of the transmitting subunit within a receive bandwidth of the receiving subunit.

Example 14 is a system including the subject matter of example 13, including or omitting features, where the transmit signal includes a wanted signal and a spur signal.

Example 15 is a system including the subject matter of examples 13-14, including or omitting features, where the transmitting subunit includes a first communication technology and the receiving subunit comprises a second communication technology. The second communication technology is different than the first communication technology.

Example 16 is a system including the subject matter of examples 13-15, including or omitting features, where the system additionally includes a transmit/receive chain coupled to the plurality of subunits.

Example 17 is a method of operating a system using multiple communication technologies for concurrent communication. A transmit unit is configured to generate a transmit signal. A receive unit is configured to receive a receive signal. A control unit determines whether potential crosstalk is present between the transmit unit and the receive unit. A reduced power amount for the transmitting unit is determined.

Example 18 is a method including the subject matter of example 17, including or omitting features, and includes adjusting the transmitting unit by the reduced power amount.

Example 19 is a method including the subject matter of examples 17-18, including or omitting features, and includes generating the transmit signal by the transmitting unit subsequent to adjusting the transmitting unit by the reduced power amount.

Example 20 is a method including the subject matter of examples 17-19, including or omitting features, and includes configuring a receiving unit to receive a receiving signal comprises a communication technology varied from the transmitting unit.

Although the invention has been illustrated and described with respect to one or more implementations, alterations and/or modifications may be made to the illustrated examples without departing from the spirit and scope of the appended claims. For example, although a transmission circuit/system described herein may have been illustrated as a transmitter circuit, one of ordinary skill in the art will appreciate that the invention provided herein may be applied to transceiver circuits as well.

Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. The any component or structure includes a processor executing instructions in order to perform at least portions of the various functions. In addition, while a particular feature of the invention may have been disclosed with respect to only one of several implementations, such feature may be combined with one or more other features of the other implementations as may be desired and advantageous for any given or particular application.

Furthermore, to the extent that the terms "including", "includes", "having", "has", "with", or variants thereof are used in either the detailed description and the claims, such terms are intended to be inclusive in a manner similar to the term "comprising".

What is claimed is:

1. A system using multiple communication technologies for concurrent communication comprising:
    a transmitting subunit configured to generate a transmit signal;
    a receiving subunit configured to receive a receive signal; and
    a control unit coupled to the transmitting subunit and the receiving subunit and configured to determine a presence of noise of the transmit signal falling into a receive band of the receive signal and to reduce power of the transmitting subunit to mitigate the presence of the noise while maintaining concurrent communication of the transmit signal and the receive signal.

2. The system of claim 1, wherein the transmitting subunit comprises a first communication technology and the receiving subunit comprises a second communication technology, where the second communication technology is different than the first communication technology.

3. The system of claim 2, wherein the first communication technology is Bluetooth and the second communication technology is UMTS.

4. The system of claim 2, wherein the control unit is configured to utilize the first communication technology and the second communication technology to determine the presence of the noise.

5. The system of claim 1, wherein the transmit signal includes a wanted signal and a spur signal.

6. The system of claim 1, wherein the transmitting subunit includes a mixer coupled to a transmit carrier frequency and a gain adjustable amplifier configured to receive an output of the mixer and to generate the transmit signal.

7. The system of claim 1, wherein the control unit is configured to determine a reduced gain that mitigates the noise at least partially based on a receive signal strength of the receive signal, to generate a reduce gain signal according to the reduced gain, and to provide the reduce gain signal to the transmitting subunit.

8. The system of claim 1, wherein the control unit is configured to determine the presence of crosstalk according to one or more factors.

9. The system of claim 8, wherein the one or more factors include one or more of, a carrier frequency of the transmit signal, a carrier frequency of the receive signal, a bandwidth of the receive signal, a frequency spur of the transmit signal, and a constant frequency.

10. The system of claim 1, wherein the receiving unit includes a mixer configured to receive the receive signal and a receiving carrier frequency.

11. The system of claim 1, wherein the transmitting subunit is configured to receive a second receive signal.

12. The system of claim 1, further comprising one or more additional subunits.

13. The system of claim 1, further comprising a transmit chain coupled to the transmitting subunit and a receive chain coupled to the receiving subunit.

14. A system using multiple communication technologies for concurrent communication comprising:
    a plurality of subunits configurable for transmitting or receiving; and
    a control unit coupled to the plurality of subunits and configured to identify concurrent communication between a transmitting subunit of the plurality of subunits and a receiving subunit of the plurality of subunits and to determine the presence of a transmit frequency spur of the transmitting subunit within a receive bandwidth of the receiving subunit and to reduce power of the transmitting unit to mitigate the transmit frequency spur and maintain the identified concurrent communication.

15. The system of claim 14, wherein the control unit is configured to determine a reduced power for the transmitting subunit in order to mitigate crosstalk between the transmitting subunit and the receiving subunit.

16. The system of claim 14, further comprising a transmit/receive chain coupled to the plurality of subunits.

17. The system of claim 14, wherein the transmitting subunit uses a first communication technology and the receiving subunit uses a second communication technology, different than the first communication technology.

18. A method of operating a system using multiple communication technologies for concurrent communication, the method comprising:
    configuring a transmitting unit to generate a transmit signal;
    configuring a receiving unit to receive a receive signal;
    determining whether potential crosstalk is present between the transmit unit and the receive unit by a control unit;
    determining a reduce power amount for the transmitting unit; and adjusting the transmit unit by the reduce power amount to mitigate the potential crosstalk and permit concurrent communication of the transmit signal and the receive signal.

19. The method of claim 18, wherein determining the reduce power amount includes factors of the receiving unit and the transmitting unit including a spur frequency of the transmitting unit, or is a function of a receive signal strength of the receive signal.

20. The method of claim 19, further comprising generating the transmit signal by the transmitting unit subsequent to adjusting the transmitting unit by the reduce power amount.

* * * * *